United States Patent
Soni et al.

(10) Patent No.: US 9,396,176 B2
(45) Date of Patent: Jul. 19, 2016

(54) TECHNIQUE FOR COPYING AND PASTING INFORMATION

(75) Inventors: Sachin Soni, Delhi (IN); Anmol Dhawan, Ghaziabad (IN); Sachin Gaur, Ghaziabad (IN); Ganesh Sahai, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 571 days.

(21) Appl. No.: 11/656,861

(22) Filed: Jan. 23, 2007

(65) Prior Publication Data

US 2014/0304628 A1 Oct. 9, 2014

(51) Int. Cl.
*G06F 3/0484* (2013.01)
*G06F 17/24* (2006.01)

(52) U.S. Cl.
CPC ............ *G06F 17/243* (2013.01); *G06F 3/0484* (2013.01)

(58) Field of Classification Search
None
See application file for complete search history.

(56) References Cited

U.S. PATENT DOCUMENTS

| 6,177,939 B1 * | 1/2001 | Blish et al. ..................... 715/770 |
| 2005/0091603 A1 * | 4/2005 | Chen ....................... G06F 9/544 715/769 |
| 2005/0102629 A1 * | 5/2005 | Chen ..................... G06F 3/0481 715/770 |

OTHER PUBLICATIONS

Xrayz Software, "ClipCache Pro", Dec. 5, 2006.*
AutoHotKey, "Remapping Keys and Buttons"/"Using Keyboard Numpad as a Mouse", Jan. 2005.*

* cited by examiner

*Primary Examiner* — Steve Young
(74) *Attorney, Agent, or Firm* — Kilpatrick Townsend & Stockton LLP

(57) ABSTRACT

A technique for copying information from one or more sources to one or more destinations. Each destination in the one or more destinations is associated with an identifier. Information that is to be copied from a source is identified. An identifier associated with a destination is acquired. The identified information is then copied to the destination associated with the acquired identifier.

12 Claims, 7 Drawing Sheets

TECHNIQUE FOR COPYING AND PASTING INFORMATION

BACKGROUND

Copy-and-paste is a popular technique for reproducing information, such as text, images, objects and the like, from a source to a destination in a computerized device, such as a personal computer. Copying and pasting typically involves making a copy of information at a source and placing the copy of the information at a destination. Cut-and-paste techniques are similar to copy-and-paste techniques in that they typically make a copy of information at the source and place the copy of the information at the destination. However, unlike typical copy-and-paste techniques, cut-and-paste techniques usually remove the information from the source.

Various techniques are used to implement copy-and-paste functions on computer systems. These techniques may employ various key combinations, pull-down menu options and/or toolbar buttons to specify when to copy information from a source and when to paste the information to a destination. For example, many windows-based operating systems, such as Linux and Microsoft Windows, often contain provisions that allow copy-and-paste to be performed using either keyboard shortcut keys or menu options. In a typical arrangement, a user navigates to the information that is to be copied, highlights the information by dragging a mouse cursor over the information while holding a mouse key and indicates to the system to copy the highlighted information by either entering a key combination, such as holding down the "CTRL" key one a keyboard while pressing a "C" key (CTRL-C), or selecting a menu option to copy the information. The user may then navigate to the destination where the information is to be copied and indicate to paste the information at the destination by entering a different key combination (e.g., CTRL-V) or selecting a different menu option to paste (copy) the information to the destination. The operating system may employ a buffer, such as an electronic clipboard, to buffer a copy of the information. Here, the information may be copied to the buffer after the user indicates to the system to copy the information and may be copied from the buffer after the user indicates to paste the information to the destination.

SUMMARY

One problem with the above-described arrangements for copying and pasting information is that they are inefficient when multiple sources of information need to be copied to multiple destinations. For example, assume a user wishes to enter an employee's name, street address, city and state that is displayed in a first window into various individual input fields contained in a document that is displayed in a second window. Using the above-described techniques, the user would navigate to the employee's name in the first window, highlight the employee's name, enter the appropriate key sequence (e.g., holding down the "CTRL" key while entering a "C" key CTRL-C)) or select an appropriate menu option to copy the employee's name. The user would then navigate to the employee name field in the second window and enter the appropriate key sequence (e.g., holding down the "CTRL" key while entering a "V" key (CTRL-V)) or select an appropriate menu option to paste the employee's name in the field. This sequence would then be repeated for the street address, city and state. As can been seen, the above-described sequence would require the user to move back and forth between the windows several times in order to copy and paste all of the information from the first window to the second window. This process may be time consuming and error prone.

The techniques described herein significantly overcome such deficiencies by providing an efficient approach for automatically copying information from one or more sources to one or more destinations. In accordance with an aspect of the techniques, each destination that is to receive a copy of information from a source is associated with an identifier that identifies the destination. The identifier for each destination may be assigned by a user which navigates to the destination and specifies the identifier, e.g., by entering a key sequence. For each source, the information at the source that is to be copied to a destination is identified. An identifier associated with the destination where the information is to be copied (pasted) is then acquired. The identifier may be acquired explicitly from, e.g., a key sequence that is entered by the user, or may be acquired implicitly from on the order in which the information is identified. A user may identify the information by highlighting the information and entering a key sequence. After the identifier is acquired, the identified information is then copied to the destination associated with the identifier.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
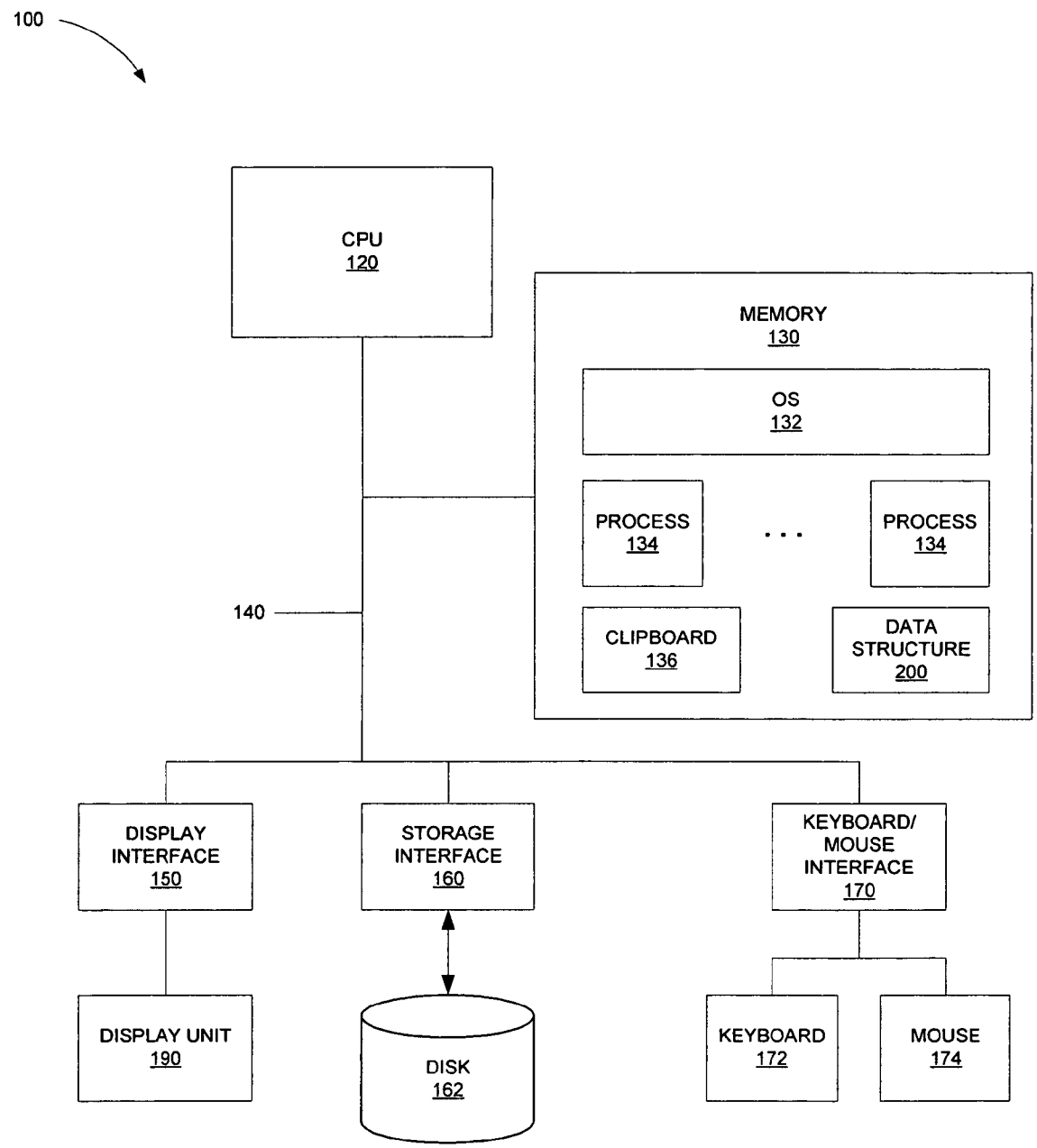
FIG. 1 is a high-level block diagram of an example of a computer system that may be used with the techniques described herein.

FIG. 1 is a high-level block diagram of an example of a computer system 100 that may be used with the techniques described herein. Referring to FIG. 1, system 100 comprises a central processing unit (CPU) 120 coupled to memory 130 and various interfaces via a local bus 140. The interfaces include a display interface 150, a storage interface 160 and a keyboard/mouse interface 170 which are coupled to various respective peripheral devices including display unit 190, disk 162 and, keyboard 172 and mouse 174. It should be noted that computer system 100 is one example of a computer system that may be used with the techniques described herein. Other computer systems, including computer systems far more complex than system 100, may be adapted to take advantage of the techniques described herein. An example of a computer system that may be used with the techniques described herein is a Personal Computer (PC) system, such as a Dimension series computer system available from Dell Incorporated, Round Rock, Tex.

The CPU 120 is a conventional processor that comprises processing circuitry for executing instructions and manipulating data contained in memory 130 including instructions and data that implement aspects of the techniques described herein. The local bus 140 is a point-to-point interconnect bus configured to couple various entities contained in system 100 including the processor 120, memory 130 and interfaces 150, 160 and 170, and enable data and signals to be transferred between these entities.

The display interface 150 is a conventional display interface (e.g., a graphics card) that comprises circuitry configured to enable the processor 120 to display information on the display unit 190, such as text, images, objects and the like, in, e.g., windows generated by the operating system (OS) 132 or processes 134. Display unit 190 is a conventional display unit, such as a Cathode Ray Tube (CRT) or a Liquid Crystal Display (LCD) display device. The keyboard/mouse interface 170 comprises circuitry configured to interface the keyboard device 172 and the mouse device 174 to the system 100 and enable data and signals to be transferred between these devices 172, 174 and the system 100. The keyboard device 172 may be a conventional 104-key PC keyboard and the mouse device 172 may be a conventional PC mouse.

The storage interface 160 is a conventional storage device interface comprising circuitry configured to interface storage devices, such as disk unit 162, to the bus 140 and enable data and signals to be transferred between the storage devices and entities on bus 140. Disk unit 162 is a conventional disk unit configured as a data storage that stores information (data) that may be used by system 100, such as text, images, objects, executable files, data files and the like.

Memory 130 is a computer-readable medium implemented as a conventional random access memory (RAM) data storage comprising RAM devices, such as dynamic RAM (DRAM) devices. Memory 130 is configured to hold software and data structures including OS 132, one or more processes 134, clipboard 136 and data structure 200. Moreover, memory 130 is configured to hold information that may be copied from one or more sources to one or more destinations in accordance with aspects of the techniques described herein.

The OS 132 is a conventional operating system comprising computer-executable instructions and data that implement various conventional operating system functions, such as scheduling processes 134 for execution on the processor 120 and managing various entities (e.g., memory 130) contained in the system 100. Moreover, OS 132 may contain computer-executable instructions and data structures that implement aspects of the techniques described herein. The processes 134 are software processes that execute under control of the OS 132. These processes 134 contain computer-executable instructions and data that may include computer-executable instructions and data that implement aspects of the techniques herein. The clipboard 136 is a conventional electronic clipboard configured to buffer information, such as text, images, objects and the like, that is accessible to the OS 132 and processes 134. This information may include information from one or more sources that may be copied to one or more destinations in accordance with the techniques described herein.

Figure 2:
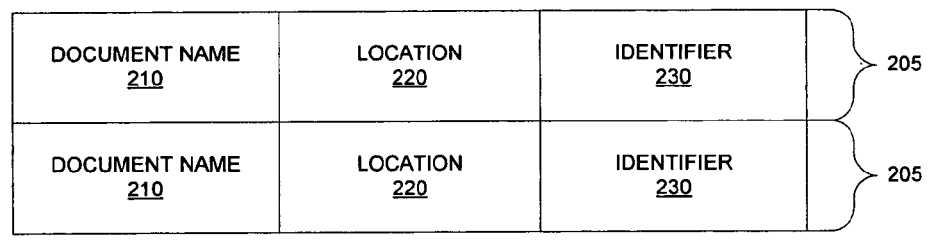
FIG. 2 is a block diagram of an example of a data structure that may be used with the techniques described herein.
Figure 2:
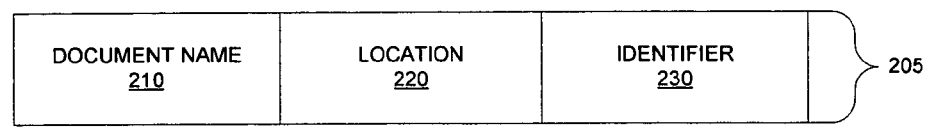

Data structure 200 is a data structure that is configured to hold information associated with one or more destinations for information that is copied from one or more sources in accordance with aspects of the techniques described herein. FIG. 2 is a block diagram of an example of data structure 200 that may be used with the techniques described herein. Data structure 200 is illustratively organized as a table comprising one or more entries 205 wherein each entry illustratively holds information associated with a destination (e.g., an input field) contained in a document.

Each entry comprises a document name field 210, a location field 220 and an identifier field 230. The document name field 210 holds a value that represents a name (e.g., path name) of the document associated with the destination. The location field 220 holds a value that represents a location of the destination in the document. The identifier field 230 holds an identifier associated with the destination. As will be described below, the information contained in an entry 205 may be used to locate a destination where information associated with a source is copied.

It should be noted that functions performed by the system 100, including functions that implement aspects of the techniques described herein, may be implemented in whole or in part using some combination of hardware and/or software. It should be further noted that computer-executable instructions and/or computer data that implement aspects of the techniques described herein may be stored in various computer-readable mediums, such as volatile memories, non-volatile memories, flash memories, removable disks, non-removable disks and the like. In addition, it should be noted that various electromagnetic signals, such as wireless signals, electrical signals carried over a wire, optical signals carried over optical fiber and the like, may be encoded to carry computer-executable instructions and/or data that implement aspects of the techniques described herein, e.g., in a communication network, such as the Internet.

Figure 3A:
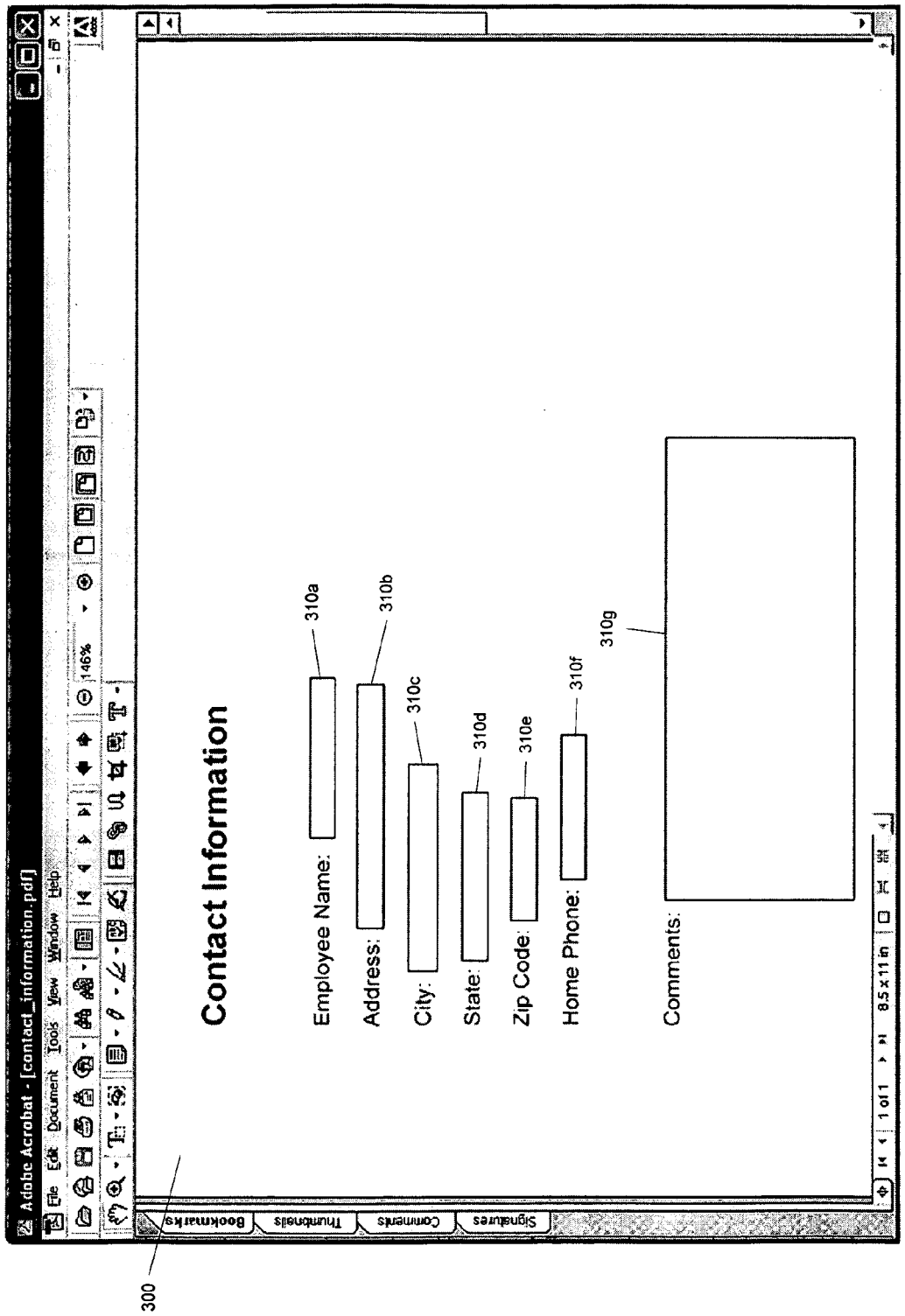
FIGS. 3A-B illustrate an example of a window containing a document comprising a plurality of fields and an example of a window containing information that may be copied to the fields, respectively, in accordance with an aspect of the techniques described herein.
Figure 3B:
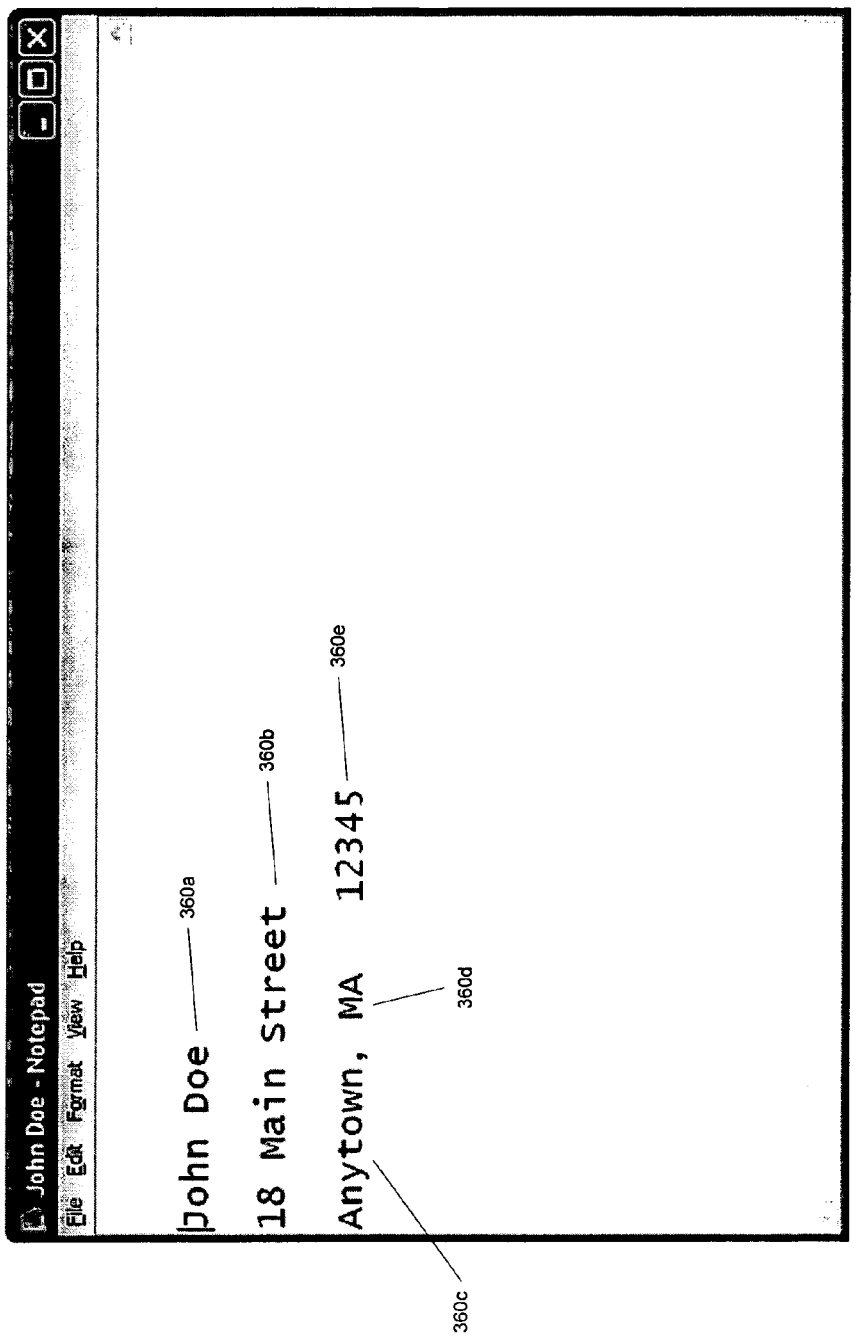

The techniques described herein may be used to copy and paste information to fields in a document. The information that is copied to the fields may be contained in a window that is displayed by system 100 and the document may be contained in another window that is displayed by system 100. FIG. 3A illustrates an example of a window containing a document 300 having fields 310 and FIG. 3B illustrates an example of a window containing information that may be copied to the fields 310 in accordance with the techniques described herein.

Document 300 is named "contact_information.pdf". The fields 310 contained in the document 300 are conventional input fields configured to input information into the document 300. These fields 310 include an employee name field 310*a*, an address field 310*b*, a city field 310*c*, a state field 310*d*, a zip code field 310*e*, a home phone field 310*f* and a comments field 310*g* which are configured to hold a name, street address, city, state, zip code, home phone number and comments associated with an employee, respectively. The information illustrated in FIG. 3B includes examples of a name 360*a* (i.e., "John Doe"), street address 360*b* (i.e., "18 Main Street"), city 360*c* (i.e., "Anytown"), state 360*d* (i.e., "MA") and zip code 360*e* (i.e., "12345") that, as will be described further below, may be copied to the name field 310*a*, address field 310*b*, city field 310*c*, state field 310*d* and zip code field 310*e*, respectively, in accordance with an aspect of the techniques described herein.

Figure 4:
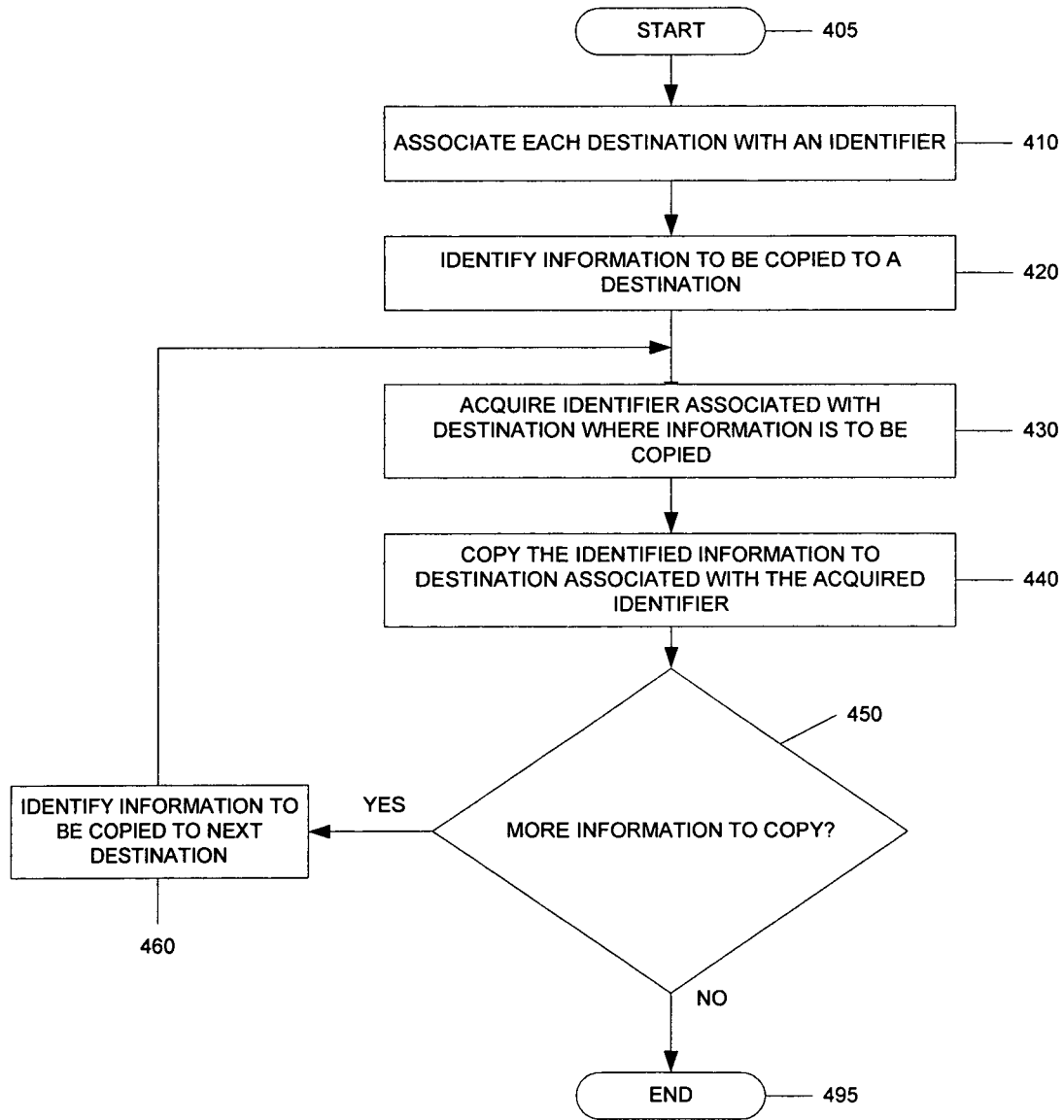
FIG. 4 is a flow chart of a sequence of steps that may be used to copy information from one or more sources to one or more destinations in accordance with an aspect of the techniques described herein.

FIG. 4 is a flow chart of a sequence of steps that may be used to copy information (data), such as, e.g., text, pictures, objects, graphics, files, etc., from one or more sources to one or more destinations in accordance with an aspect of the techniques described herein. The sequence begins at step 405 and proceeds to step 410 where each destination that is to receive information is associated with an identifier. As will be described further below, a user may specify an identifier that is to be associated with a destination by navigating to the destination and entering (inputting) a key sequence into the system that the specifies the identifier. The system, in turn, may associate the identifier with the destination by generating an entry in a data structure, such as data structure 200, for the destination that associates the destination with the identifier. At step 420, the information to be copied from a source to a destination is identified. Here, a user may identify the information by specifying (e.g., "highlighting" the information at the source using a mouse device, such as mouse 174) or selecting the information and entering a key sequence into the system, such as CTRL-C (e.g., holding down the "CTRL" key and entering the "C" key), via a keyboard device and/or selecting an option listed in a pull-down menu on the system using a mouse device. The system may then identify the information to be copied from the information that is highlighted and place a copy of the identified information in a buffer, such as clipboard 136.

Next, at step 430, an identifier associated with the destination where the information is to be copied is acquired. Here, a user may explicitly specify the destination's identifier by inputting a key sequence that represents the identifier into the computer system via a keyboard device. The inputted identifier is used to identify a destination for the information. Alternatively, the identifier may be implied (implicitly acquired) from the order in which the source information is identified or placed in a buffer, such as clipboard 136. Here, an application may continually monitor the buffer to detect when information has been is placed in the buffer. The information may then be placed at destinations based on the order in which the information is placed in the buffer.

For example, a user may specify a first destination for information by navigating to the destination and entering a key sequence, such as CTRL-V+1 (e.g., holding down the "CTRL" key while entering the "V" key and then entering the 1 key). The user may then specify a second destination by navigating to the second destination and entering the key sequence CTRL-V+2. The user may then identify information at a first source to be placed in the first destination by navigating to the information, highlighting it, as described above, and entering a key sequence, such as CTRL-C. Since this is the first source of information that is identified, the system may imply that the identifier for the destination of this information is the identifier associated with the first destination because this information was the first source of information that was identified. The system may then automatically copy the information to the first specified destination which in this example was the destination specified using the CTRL-V+1 key sequence. Alternatively, the system may place the information in a buffer, such as clipboard 136. An application running on the system may detect that the information is the first information that has been placed in the buffer and automatically copy the information to the first specified destination.

The user may then identify information at a second source to be placed in the second destination by navigating to the second source, highlighting it, as described above, and entering the same key sequence, i.e., CTRL-C. The system, in turn, may imply that the identifier for the destination for this information is the identifier associated with the second destination because this information was the second source of information that was identified. The system may then automatically copy the information to the second specified destination which in this example was specified using the CTRL-V+2 key sequence. Alternatively, the system may place the information in the buffer. The application may then detect that the information is the second information that has been placed in the buffer and automatically copy it to the second specified destination.

At step 440, in response to acquiring the identifier associated with the destination at step 430, the identified information is automatically copied to the destination associated with the acquired identifier. At step 450, a check is performed to determine if there is more information to copy. If so, the sequence proceeds to step 460 where the information to be copied to a next destination is identified, as described above, and the sequence returns to step 430. Otherwise, if at step 450 no more information is to be copied, the sequence proceeds to step 495 where the sequence ends.

Figure 5A:
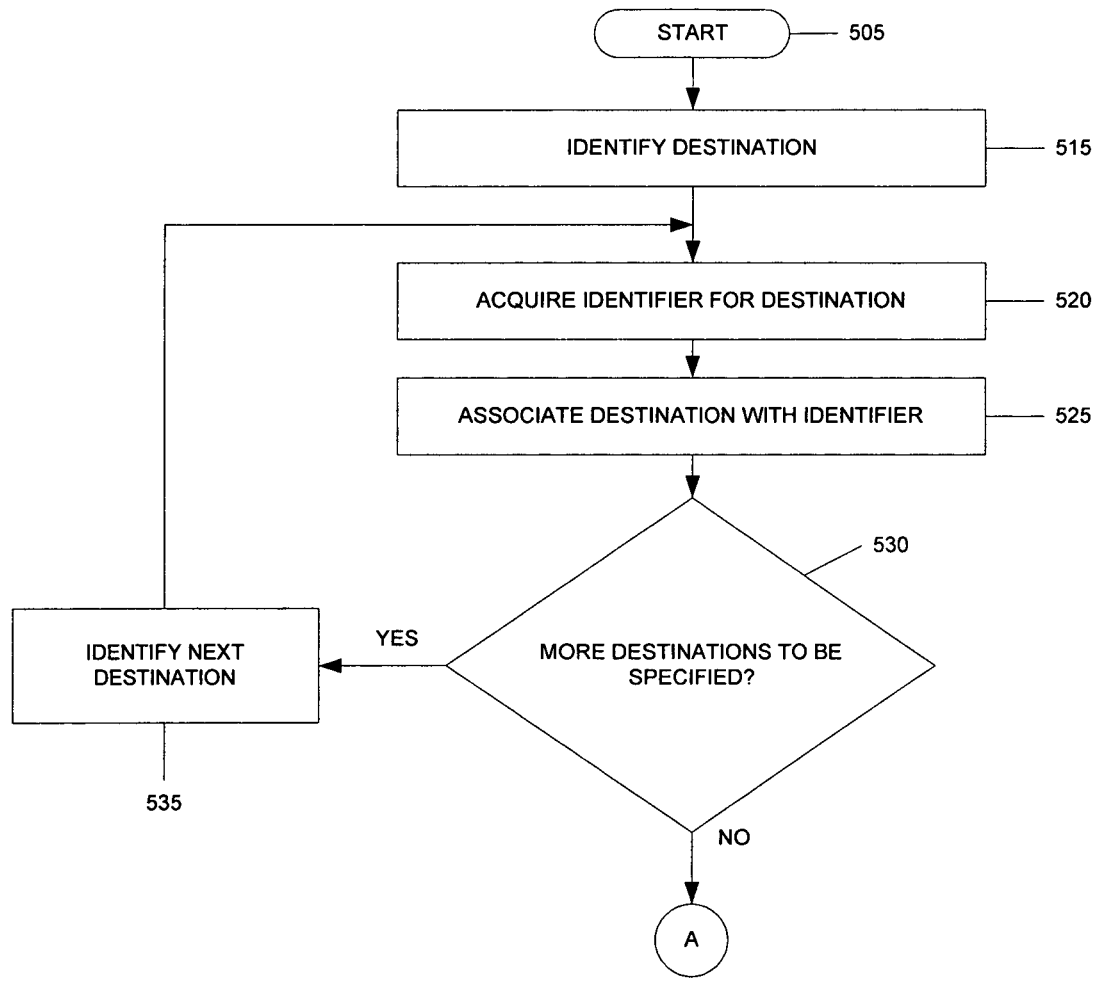
FIGS. 5A-B are a flow chart of a sequence of steps that may be used to copy information from one or more sources to one or more destinations in accordance with an aspect of the techniques described herein.
Figure 5B:
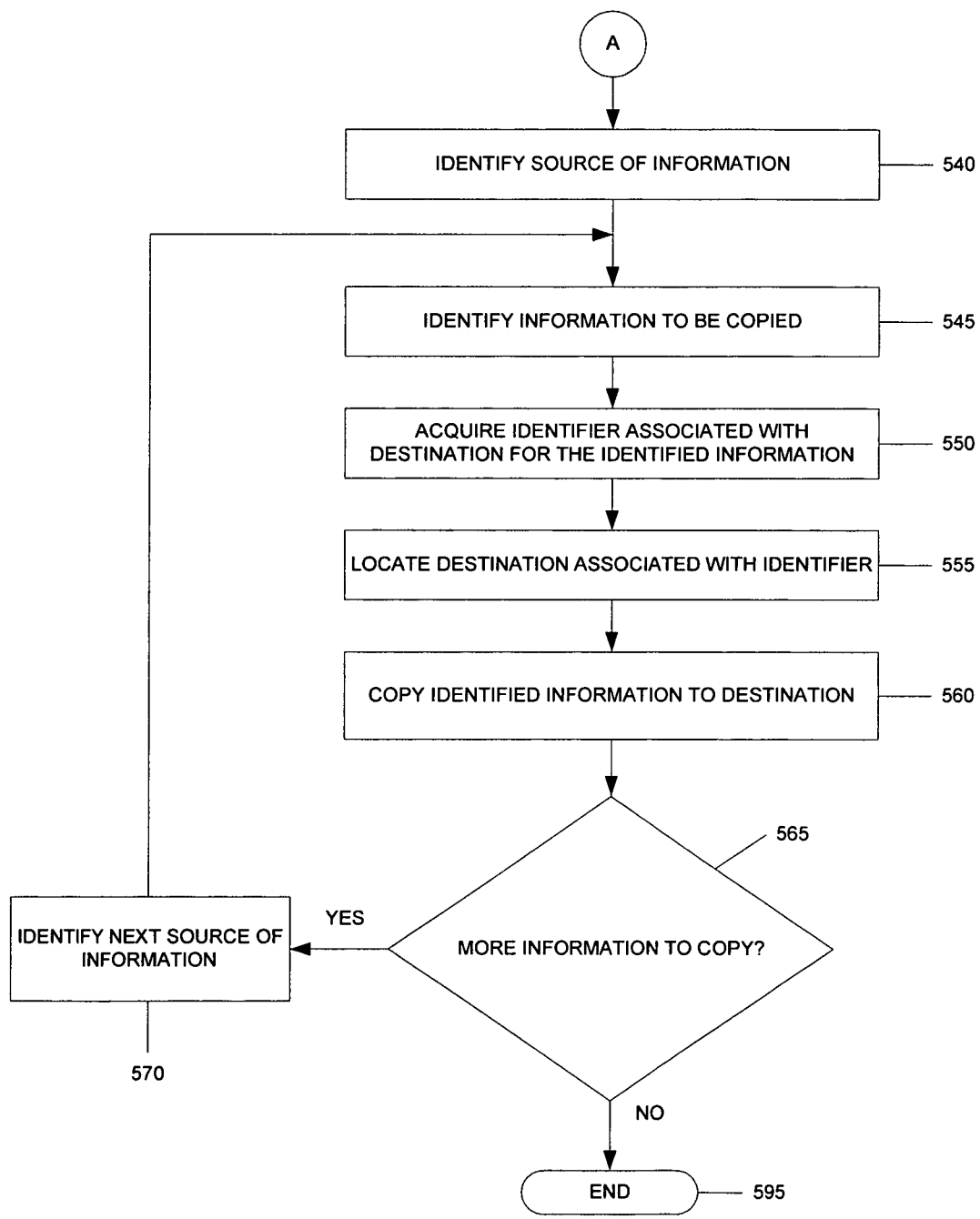

FIGS. 5A-B are a flow chart of a sequence of steps that may be used to copy information from one or more sources to one or more destinations in accordance with the techniques described herein. The sequence begins at step 505 and proceeds to step 515 where a destination is identified. Here, a user may navigate to the destination by inputting certain key sequences (e.g., pressing the tab key one or more times to tab to a field) to position a screen cursor to the location of the destination or by moving a mouse cursor to the destination and clicking a mouse button to position the screen cursor at that location. The system may then acquire the screen cursor's coordinates which may be used to determine the location of the destination. Alternatively, the location of the destination may be determined from a name associated with the destination (e.g., a name associated with a field).

At step 520, the identifier for the destination is acquired. As noted above, the identifier may acquired from a key sequence entered by a user via a keyboard device. Next, at step 525, the destination is associated with the acquired identifier. Illustratively, the destination may be associated with the identifier by generating an entry 205 in data structure 200 that is associated with the destination and that contains the name of a document associated with the destination, the determined location of the destination and the acquired identifier. A check is then performed, at step 530, to determine if more destinations are to be specified. If so, the sequence proceeds to step 535 where the next destination is identified, as described above, and the sequence then returns to step 520.

If no more destinations are to be specified, the sequence proceeds to step 540 (FIG. 5B) where the source of the information is identified. The source may be identified by determining the location of source of the information, as described above. This determination may be made by acquiring the location of a screen cursor positioned at the source of the information. At step 545, the information associated with the source is identified. As noted above, the information may be identified by highlighting the information and entering a key sequence or selecting a menu option. Next, at step 550, the identifier associated with the destination where the identified information is to be copied is acquired. As noted above, the identifier may be acquired by, e.g., reading a key sequence entered by a user via a keyboard device or may be acquired from the order in which the source information is identified or placed in a buffer.

In response to acquiring the identifier at step 550, at step 555 the destination is located using the identifier and at step 560 the identified information is copied to the destination. Specifically, at step 555, the identifier is illustratively used, e.g., to locate an entry 205 in data structure 200 whose identifier field 230 contains a value that matches the identifier specified by the user. At step 560, the identified information is illustratively copied to the destination at the location specified in the location field 220 of the matching entry 205.

A check is then performed, at step 565, to determine if there is more information to be copied. If so, the sequence proceeds to step 570 where the next source of information is identified, as described above, and the sequence returns to step 545. Otherwise, if there is no more information to be copied, the sequence proceeds to step 595 where the sequence ends.

For example, referring to FIGS. 1, 2, 3A-B and 5A-B, suppose that a user at system 100 wishes to copy the name of an employee and the employee's street address to fields 310a and 310b, respectively, of form 300. Further, assume that the employee's name and street address that is to be copied is the employee name 360a and street address 360b illustrated in FIG. 3B.

The user identifies the first destination by navigating to field 310a to position the screen cursor at the beginning of the field. System 100 acquires the position of the screen cursor and uses this to determine the location of the field 310a (step 515). The user then inputs an identifier to further identify the field 310a. System 100 acquires the identifier (step 520) and associates field 310a with the identifier (step 525) by illustratively generating an entry 205 in data structure 200 for field 310a that identifies the document in the entry's document name field 210, the location of field 310a in the entry's location field 220 and the identifier specified by the user in field 230.

Since the user wishes to also copy the employee's street address, more destinations need to be specified (step 530) so the user navigates to the next destination which is field 310b (step 535) and specifies an identifier for this field 310b, as described above. In addition, the system 100 determines the location of field 310b and generates an entry 205 in data structure 200 for field 310b to associate the destination with the identifier, as described above.

After the destinations have been identified, the information to be copied to the destinations is identified. Specifically, in this example, the user navigates to the information that is to be copied to field 310a (i.e., the employee's name 360a) to identify the source of the information (step 540) and identifies the information that is to be copied to the field 310a (step 545). Assume the user identifies the information by highlighting the information and enters a key sequence via the keyboard 172, as described above. The system 100 may then place a copy of the highlighted information on the clipboard 136. The user may then enter an identifier associated with the destination for the identified information which is this example is the previously specified identifier for field 310a. Alternatively, the identifier may be implied, as described above.

System 100 acquires the identifier (step 550) and uses the identifier to locate an entry 205 in data structure 200 that is associated with field 310a. The system 100 then uses the location 220 contained in the entry 205 to determine the location of field 310a (step 555) and copies the information from the clipboard 136 to field 310a (step 560). Since there are more destinations (i.e., 310b) to process (step 565), the may then identify the next source of information (i.e., the street address 360b), as described above, (step 570) and the above is repeated to copy this information to the next destination (i.e., field 310b).

It should be noted that a cut-and-paste technique may be adapted to take advantage of the techniques described herein. Moreover, It should be noted that the techniques described herein may be adapted to copy information within a document, window, file, etc., or between multiple documents, windows, files, etc.

While techniques described herein have been particularly shown and described with reference to particular embodiments, it will be understood by those skilled in the art that various changes in form and details may be made therein without departing from the scope and spirit of the invention encompassed by the appended claims. As such, the foregoing described embodiments are not intended to be limiting. Rather, any limitations to embodiments of the invention are presented in the following claims.

What is claimed is:

1. A computer-implemented method comprising:
   receiving a selection of first and second destinations in a target document, the first destination comprising a first location within the target document, and the second destination comprising a second location within the target document;
   receiving inputs of first and second key sequences from an input device, each key sequence comprising a plurality of key presses, the first key sequence corresponding to the selection of the first destination and the second key sequence corresponding to the selection of the second destination, the first key sequence different from the second key sequence;
   generating and storing first and second associations in first and second records in a data structure, the first record comprising a document identifier of the target document, the first key sequence, and the first destination, the second record comprising the document identifier of the target document, the second key sequence, and the second destination;
   after generating and storing the first and second associations:
   receiving a selection of content from a first source document;
   receiving an input of a key sequence from the input device, the key sequence comprising a plurality of key presses, and
   in response only to receiving the input:
   identifying one of the first or second associations based on the key sequence,
   identifying the respective destination and the target document associated with the identified association,
   copying the selected content into a clipboard buffer, wherein the clipboard buffer is separate from the source document; and
   pasting the selected content from the clipboard buffer to the identified destination.

2. The method of claim 1 wherein the first and second destinations are input fields configured to input information into multiple documents.

3. The method of claim 1 wherein the destinations are input fields configured to input information into multiple documents.

4. The method of claim 1 wherein an application monitors the clipboard buffer to detect when the selected content enters the clipboard buffer.

5. The method of claim 1 wherein at least one of the first or second locations comprises a location of a screen cursor.

6. The method of claim 1 wherein the first location is a name of a field, wherein the field is configured to input the selected content at the destination.

7. The method of claim 1, wherein the target document comprises a first target document, and further comprising:
   receiving a selection of a third destination in a second target document, receiving inputs of third key sequence from the input device, the third key sequence comprising a plurality of key presses, the third key sequence corresponding to the selection of the third destination;

generating and storing a third association in a third record in the data structure, the third record comprising a document identifier of the second target document, the third key sequence, and the third destination; and wherein the identifying one of the first or second associations comprises identifying one of the first, second or third associations based on the key sequence, and wherein the identifying the respective destination comprises identifying the respective target document.

8. The method of claim 1, wherein the selected content is copied to the clipboard buffer only after (i) the identifying one of the first or second associations based on the key sequence, and (ii) the identifying the respective destination and the target document associated with the identified association.

9. A non-transitory computer readable storage medium comprising:

instructions for receiving a selection of first and second destinations in a target document, the first destination comprising a first location within the target document, and the second destination comprising a second location within the target document;

instructions for receiving inputs of first and second key sequences from an input device, each key sequence comprising a plurality of key presses, the first key sequence corresponding to the selection of the first destination and the second key sequence corresponding to the selection of the second destination, the first key sequence different from the second key sequence;

instructions for generating and storing first and second associations in first and second records in a data structure, the first record comprising a document identifier of the target document, the first key sequence, and the first destination, the second record comprising the document identifier of the target document, the second key sequence, and the second destination;

instructions for, after generating and storing the first and second associations:

receiving a selection of content from a first source document;

receiving an input of a key sequence from the input device, the key sequence comprising a plurality of key presses, and instructions for, in response only to receiving the input signal:

identifying one of the first or second associations based on the key sequence, identifying the respective destination and the target document associated with the identified association, copying the selected content into a clipboard buffer, wherein the clipboard buffer is separate from the source document; and pasting the selected content to the identified destination.

10. The non-transitory computer readable storage medium of claim 9 wherein the first and second destinations are input fields configured to input information into multiple documents.

11. The non-transitory computer readable storage medium of claim of claim 9 wherein an application monitors the buffer to detect when the information enters the buffer.

12. The non-transitory computer readable storage medium of claim 9 wherein at least one of the first or second locations comprises a location of a screen cursor.

\* \* \* \* \*